United States Patent
Yoshida et al.

(10) Patent No.: US 9,671,717 B2
(45) Date of Patent: Jun. 6, 2017

(54) OPTICAL SCANNING DEVICE, IMAGE FORMING APPARATUS, APERTURE FIXING METHOD

(71) Applicant: KYOCERA Document Solutions Inc., Osaka-shi, Osaka (JP)

(72) Inventors: Shingo Yoshida, Osaka (JP); Hideji Mizutani, Osaka (JP); Takayuki Kurihara, Osaka (JP); Kosuke Uchida, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/079,564

(22) Filed: Mar. 24, 2016

(65) Prior Publication Data

US 2016/0282750 A1 Sep. 29, 2016

(30) Foreign Application Priority Data

Mar. 27, 2015 (JP) ................................ 2015-067260

(51) Int. Cl.
*G02B 26/10* (2006.01)
*G03G 15/043* (2006.01)
(Continued)

(52) U.S. Cl.
CPC ............ *G03G 15/043* (2013.01); *B41J 2/473* (2013.01); *G02B 26/123* (2013.01);
(Continued)

(58) Field of Classification Search
CPC .. G03G 15/043; G02B 26/123; G02B 26/124; H04N 1/0283; H04N 1/02885; H04N 1/06
(Continued)

(56) References Cited

U.S. PATENT DOCUMENTS

| | | | | |
|---|---|---|---|---|
| 2005/0062836 A1* | 3/2005 | Nakajima | ............ | G03G 15/011 347/225 |
| 2006/0164707 A1 | 7/2006 | Kurihara et al. | | |
| 2006/0262177 A1* | 11/2006 | Wada | ..................... | H04N 1/506 347/224 |
| 2006/0262373 A1* | 11/2006 | Oda | ..................... | G02B 26/123 359/205.1 |
| 2006/0268095 A1* | 11/2006 | Ono | ..................... | G02B 26/123 347/230 |
| 2012/0105851 A1 | 5/2012 | Kobayashi et al. | | |

(Continued)

FOREIGN PATENT DOCUMENTS

EP 2950131 A1 12/2015
JP 03160411 A * 7/1991
(Continued)

OTHER PUBLICATIONS

European Patent Office, Extended European Search Report Issued in Application No. 16161908.5, Aug. 8, 2016, Germany, 9 pages.

*Primary Examiner* — David M Gray
*Assistant Examiner* — Michael Harrison
(74) *Attorney, Agent, or Firm* — Alleman Hall Creasman & Tuttle LLP

(57) ABSTRACT

An optical scanning device includes a scanning member, a plurality of light sources, a first reflection mirror, and a second reflection mirror. The scanning member scans incident laser beams in a predetermined main scanning direction. The plurality of light sources emit the laser beams from positions that are different along a sub scanning direction that is perpendicular to an optical axis direction of the laser beams and the main scanning direction. The first reflection mirror is inclined around the main scanning direction as a rotation axis, is inclined around the sub scanning direction as another rotation axis, and reflects the laser beams emitted from the light sources. The second reflection mirror is inclined around the main scanning direction as a rotation (Continued)

axis, is inclined around the sub scanning direction as another rotation axis, and reflects the laser beams reflected by the first reflection mirror toward the scanning member.

12 Claims, 17 Drawing Sheets

(51) Int. Cl.
  *B41J 2/47* (2006.01)
  *G02B 26/12* (2006.01)
  *H04N 1/028* (2006.01)
  *H04N 1/06* (2006.01)
(52) U.S. Cl.
  CPC ........ *G02B 26/124* (2013.01); *H04N 1/0283* (2013.01); *H04N 1/02885* (2013.01); *H04N 1/06* (2013.01); *H04N 2201/0094* (2013.01); *H04N 2201/02493* (2013.01)

(58) Field of Classification Search
  USPC .............................................................. 399/4
  See application file for complete search history.

(56) References Cited

U.S. PATENT DOCUMENTS

| | | | | |
|---|---|---|---|---|
| 2015/0346482 | A1* | 12/2015 | Yoshida | ........... G03G 15/04072 347/118 |
| 2015/0346486 | A1* | 12/2015 | Yoshida | ................ G03G 15/04 347/118 |
| 2015/0346630 | A1* | 12/2015 | Yoshida | ........... G03G 15/04072 347/118 |

FOREIGN PATENT DOCUMENTS

| | | |
|---|---|---|
| JP | H10010447 A | 1/1998 |
| JP | 2006184750 A | 7/2006 |

* cited by examiner

OPTICAL SCANNING DEVICE, IMAGE FORMING APPARATUS, APERTURE FIXING METHOD

INCORPORATION BY REFERENCE

This application is based upon and claims the benefit of priority from the corresponding Japanese Patent Application No. 2015-067260 filed on Mar. 27, 2015, the entire contents of which are incorporated herein by reference.

BACKGROUND

The present disclosure relates to an optical scanning device for scanning a laser beam, an image forming apparatus including the optical scanning device, and an aperture fixing method.

An electrophotographic image forming apparatus includes an optical scanning device that forms an electrostatic latent image on a photoconductor by scanning a laser beam over the surface of the photoconductor. The optical scanning device includes a light source and a polygon mirror, wherein the light source emits a laser beam, and the polygon mirror scans the laser beam emitted from the light source. In addition, there is known a configuration where one polygon mirror is used to scan laser beams irradiated from a plurality of light sources. Specifically, the plurality of light sources are disposed at different positions along a sub scanning direction that is perpendicular to an optical axis direction of the laser beams and a main scanning direction in which the laser beams are scanned. In this configuration, laser beams from the light sources are incident on the polygon mirror at different angles, and are reflected and guided thereby to corresponding photoconductor drums.

SUMMARY

An optical scanning device according to an aspect of the present disclosure includes a scanning member, a plurality of light sources, a first reflection mirror, and a second reflection mirror. The scanning member scans incident laser beams in a predetermined main scanning direction. The plurality of light sources emit the laser beams respectively from positions that are different along a sub scanning direction that is perpendicular to an optical axis direction of the laser beams and the main scanning direction. The first reflection mirror is inclined around the main scanning direction as a rotation axis, is inclined around the sub scanning direction as another rotation axis, and reflects the laser beams emitted from the light sources. The second reflection mirror is inclined around the main scanning direction as a rotation axis, is inclined around the sub scanning direction as another rotation axis, and reflects the laser beams reflected by the first reflection mirror toward the scanning member.

An image forming apparatus according to another aspect of the present disclosure includes the optical scanning device.

An aperture fixing method according to a further aspect of the present disclosure includes: photographing, at a predetermined position, a laser beam that has passed through the opening portion in a state where the first blocking member is inserted in the first cut portion of the aperture; identifying a center position in the longitudinal direction of the opening portion, of the laser beam that has passed through the opening portion, based on a photographed image of the laser beam; and adjusting a fixed state of the aperture based on an identified center position of the laser beam in the longitudinal direction of the opening portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

[First Embodiment]

The following describes embodiments of the present disclosure with reference to the drawings, for the understanding of the disclosure. It is noted that embodiments described in the following are merely concrete examples of the present disclosure, and should not limit the technical scope of the present disclosure.

[Outlined Configuration of Image Forming Apparatus 10]

First, an outlined configuration of an image forming apparatus 10 in an embodiment of the present disclosure is described.

Figure 1:
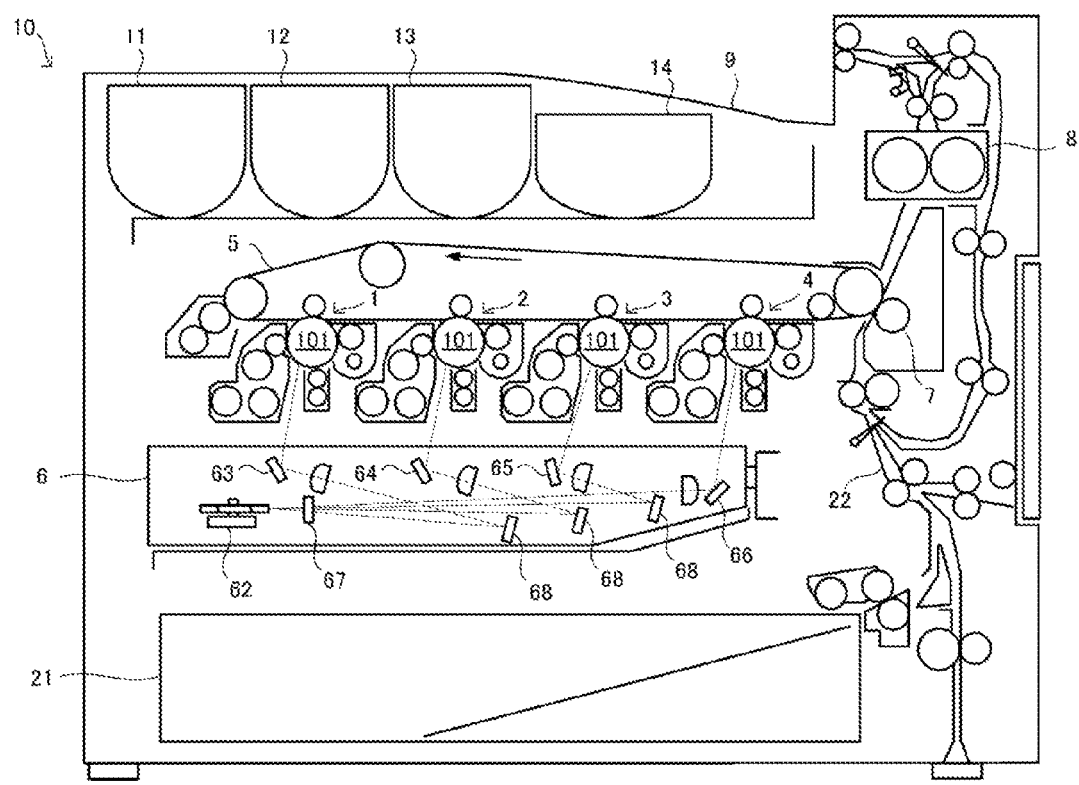
FIG. 1 is a diagram showing the configuration of an image forming apparatus according to the first embodiment of the present disclosure.

As shown in FIG. 1, the image forming apparatus 10 is a color printer including a plurality of image forming units 1-4, an intermediate transfer belt 5, an optical scanning device 6, a secondary transfer roller 7, a fixing device 8, a sheet discharge tray 9, a sheet feed cassette 21, and a conveyance path 22. The image forming apparatus 10 forms a monochrome image or a color image on a sheet based on input image data. It is noted that the sheet is a sheet-like material such as a sheet of paper, a sheet of coated paper, a postcard, an envelope, or an OHP sheet. In addition, other examples of the image forming apparatus of the present disclosure include a facsimile, a copier, and a multifunction peripheral.

The image forming units 1-4 are electrophotographic image forming units each including a photoconductor drum 101, a charging device, a developing device, a primary transfer roller, and a cleaning device. The image forming units 1-4 are arranged in an alignment along the running direction (horizontal direction) of the intermediate transfer belt 5, and form an image forming portion of a so-called tandem method. Specifically, the image forming unit 1 forms a toner image corresponding to C (cyan), the image forming unit 2 forms a toner image corresponding to M (magenta), the image forming unit 3 forms a toner image corresponding to Y (yellow), and the image forming unit 4 forms a toner image corresponding to K (black).

The intermediate transfer belt 5 is an intermediate transfer member on which the toner images of the respective colors are intermediately transferred from the photoconductor drums 101 of the image forming units 1-4. The optical scanning device 6 forms electrostatic latent images on the photoconductor drums 101 of the image forming units 1-4, by irradiating laser beams onto the photoconductor drums 101 based on the input image data of the respective colors.

In the image forming apparatus 10 configured as such, a color image is formed in the following procedure on a sheet supplied from the sheet feed cassette 21 along the conveyance path 22, and the sheet with the image formed thereon is discharged onto the sheet discharge tray 9. It is noted that various types of conveyance rollers are provided in the conveyance path 22 in such a way as to convey a shee stacked on the sheet feed cassette 21 to the sheet discharge tray 9 via the secondary transfer roller 7 and the fixing device 8.

First, in the image forming units 1-4, the charging devices charge the surfaces of the photoconductor drums 101 uniformly to a certain potential. Next, the optical scanning devices 6 irradiate the surfaces of the photoconductor drums 101 with laser beams based on the image data. With this operation, electrostatic latent images are formed on the surfaces of the photoconductor drums 101. The electrostatic latent images on the photoconductor drums 101 are developed (visualized) as toner images of respective colors by the developing devices. It is noted that toners (developers) are supplied from toner containers 11-14 of respective colors that are configured to be attachable/detachable.

Subsequently, the toner images of respective colors formed on the photoconductor drums 101 of the image forming units 1-4 are transferred by the primary transfer rollers in sequence onto the intermediate transfer belt 5 so as to be overlaid thereon. With this operation, a color image is formed on the intermediate transfer belt 5 based on the image data. Next, the color image on the intermediate transfer belt 5 is transferred by the secondary transfer roller 7 onto the sheet that has been conveyed from the sheet feed cassette 21 via the conveyance path 22. Subsequently, the color image transferred on the sheet is heated by the fixing device 8 so as to be fused and fixed onto the sheet. It is noted that the toner that has remained on the surfaces of the photoconductor drums 101 is removed by the cleaning devices.

In addition, the image forming apparatus 10 includes a contact/separation mechanism (not shown) that causes the photoconductor drums 101 and the first transfer rollers of the image forming units 1-3 to contact and separate from the intermediate transfer belt 5. When a monochrome image is printed in the image forming apparatus 10, the contact/separation mechanism causes the photoconductor drums 101 and the first transfer rollers of the image forming units 1-3 to separate from the intermediate transfer belt 5. With this operation, only a black toner image is transferred from the image forming unit 4 to the intermediate transfer belt 5, and a monochrome image is transferred from the intermediate transfer belt 5 to the sheet.

[Configuration of Optical Scanning Device 6]

Next, details of the optical scanning device 6 are described.

Figure 2:
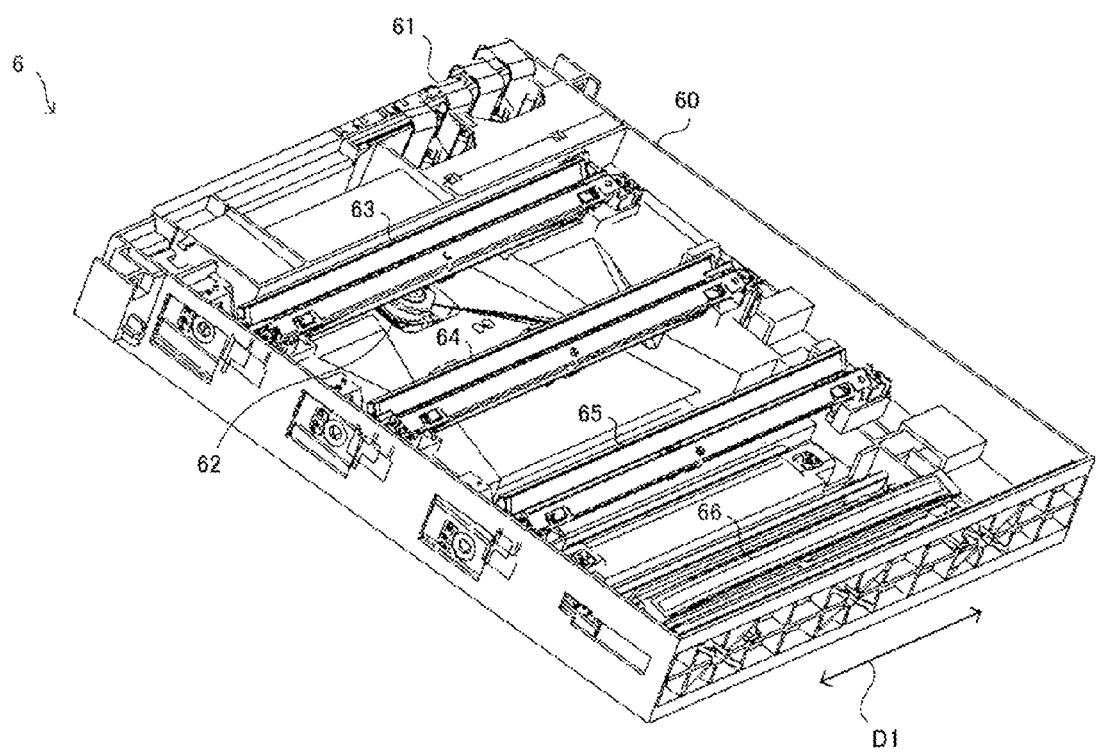
FIG. 2 is a diagram showing the configuration of an optical scanning device according to the first embodiment of the present disclosure.

As shown in FIG. 1 and FIG. 2, the optical scanning device 6 includes a unit housing 60, a light source unit 61, a polygon mirror (an example of the scanning member) 62, outgoing mirrors 63-66, a scanning lens 67, and a reflection mirror 68. In the optical scanning device 6, laser beams respectively corresponding to the image forming units 1-4 are emitted from the light source unit 61 and are deflected and scanned in a main scanning direction D1 by the polygon mirror 62. The laser beams scanned by the polygon mirror 62 are guided to the outgoing mirrors 63-66 via optical elements such as the scanning lens 67 and the reflection mirror 68. Subsequently, the laser beams reflected on the outgoing mirrors 63-66 are irradiated onto the photoconductor drums 101 of the image forming units 1-4. It is noted that a direction perpendicular to the main scanning direction D1 on the surface of each photoconductor drum 101 and a direction perpendicular to the main scanning direction D1 on the surface of the polygon mirror 62 are both referred to as a sub scanning direction D2. In addition, a direction of the optical axis of the laser beam emitted from the light source unit 61 is referred to as an optical axis direction D3.

Figure 3:
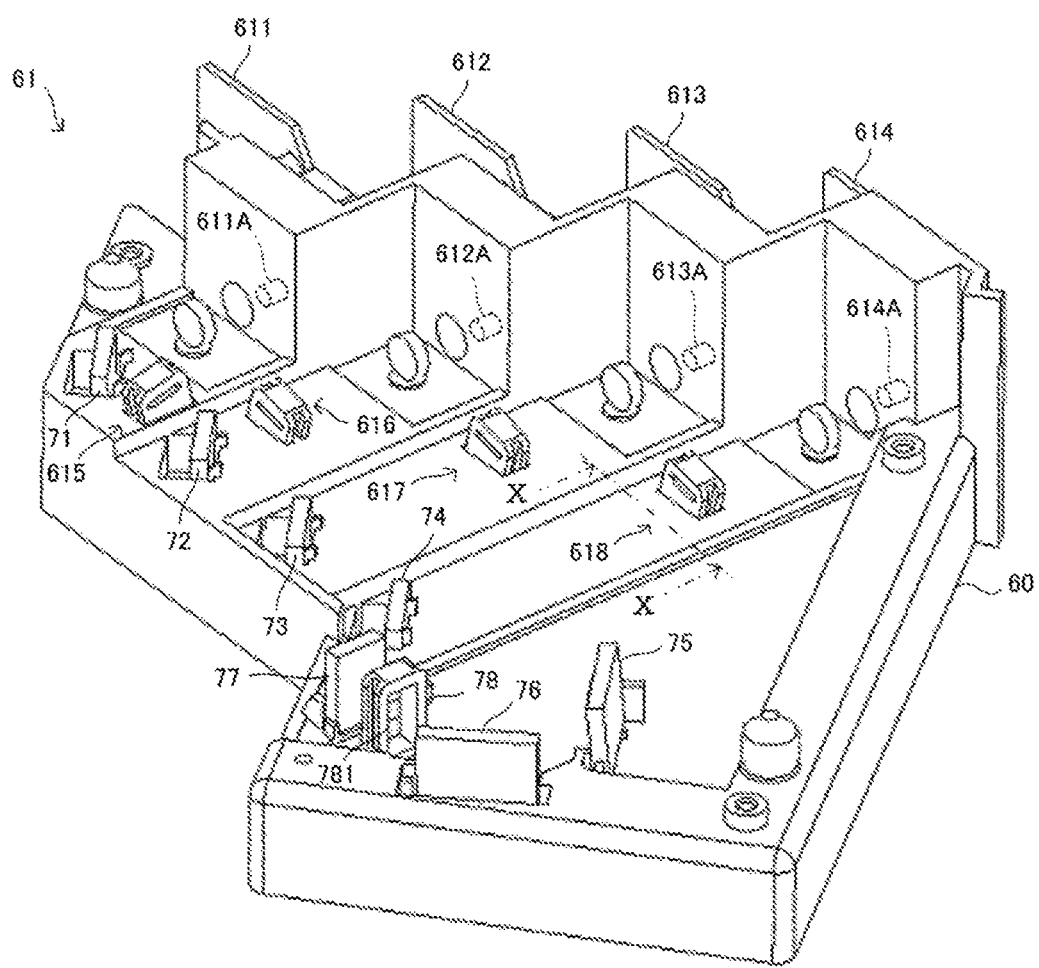
FIG. 3 is a diagram showing the configuration of a light source unit of the optical scanning device according to the first embodiment of the present disclosure.
Figure 4:
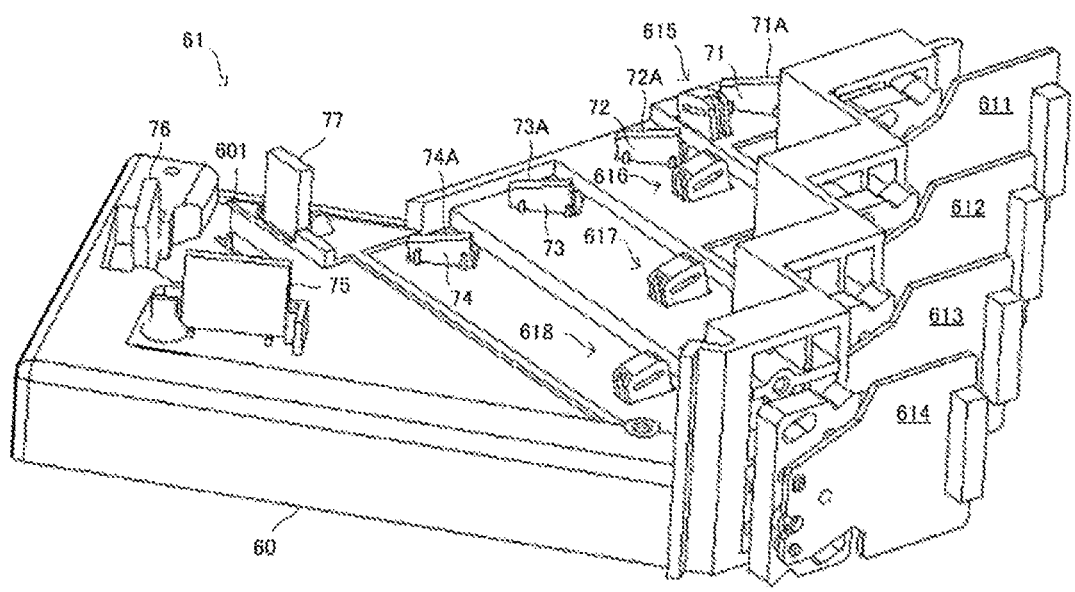
FIG. 4 is a diagram showing the configuration of the light source unit of the optical scanning devic17ce according to the first embodiment of the present disclosure.

As shown in FIG. 3 and FIG. 4, the light source unit 61 includes LD boards 611-614, outgoing optical systems 615-618, a first reflection mirror 75, a second reflection mirror 76, third reflection mirrors 71-74, a cylindrical lens 77, and an aperture 78. In the optical scanning device 6, the first reflection mirror 75, the second reflection mirror 76, the cylindrical lens 77, the aperture 78, and the polygon mirror 62 are used in common for scanning a plurality of laser beams emitted from the light source unit 61. It is noted that in FIG. 4, the aperture 78 is omitted, and an attachment portion 601 to which the aperture 78 is attached is shown.

The LD boards 611-614 are boards on which laser diodes 611A-614A are mounted as the light sources that emit laser beams that respectively correspond to the photoconductor drums 101. Here, the laser diodes 611A-614A are disposed at different positions along the sub scanning direction D2. The laser diodes 611A-614A each may be a single-beam laser diode which emits a single laser beam, or may be a monolithic multi-beam laser diode which emits a plurality of laser beams. It is noted that when the laser diodes 611A-614A are monolithic multi-beam laser diodes, the optical scanning device 6 can write electrostatic latent images on the photoconductor drums 101 simultaneously by using a plurality of lines.

The outgoing optical systems 615-618 emit, as parallel luminous fluxes, the laser beams emitted from the laser diodes 611A-614A respectively, and restrict the beam path widths of the laser beams.

The third reflection mirrors 71-74 reflect, toward the first reflection mirror 75, laser beams emitted from the outgoing optical systems 615-618. In addition, the first reflection mirror 75 and the second reflection mirror 76 are disposed in the state where they are inclined by a predetermined angle around the sub scanning direction D2 as the rotation axis. With this configuration, the first reflection mirror 75 reflects the laser beams toward the second reflection mirror 76. In addition, the second reflection mirror 76 reflects the laser beams toward the polygon mirror 62. At this time, the laser beams reflected by the second reflection mirror 76 are incident on the cylindrical lens 77 via the aperture 78.

The aperture 78 includes an opening portion 781 that restricts, to a width in a predetermined range, the width in the main scanning direction D1 of the laser beam that comes from the second reflection mirror 76 and is incident on the cylindrical lens 77. The aperture 78 is fixed to the unit housing 60 in the state where the aperture 78 is inserted in the attachment portion 601 formed in the unit housing 60 and the position of the aperture 78 in the first direction D1 has been adjusted. Here, the unit housing 60 including the attachment portion 601 is an example of the first base portion.

Figure 5:
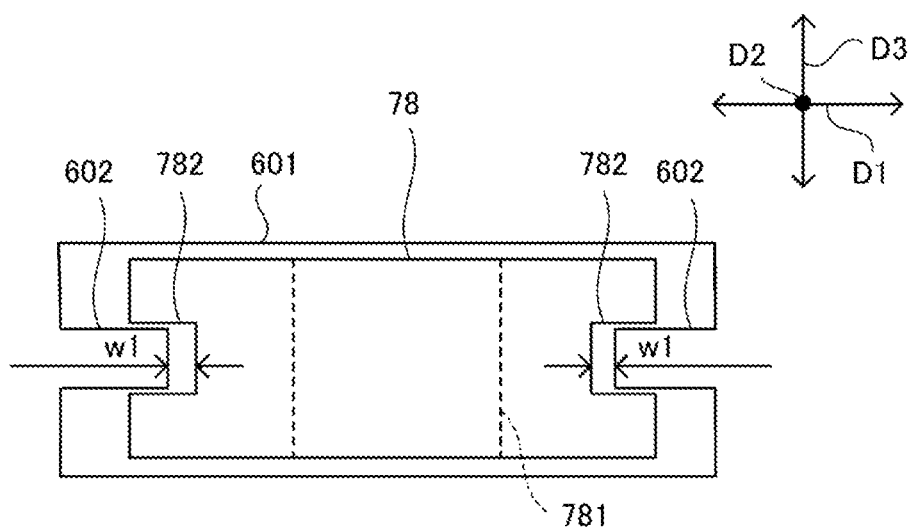
FIG. 5 is a plan view of a second aperture of the optical scanning device according to the first embodiment of the present disclosure.

FIG. 5 is a plan view showing the state where the aperture 78 is inserted in the attachment portion 601. As shown in FIG. 5, the aperture 78 includes groove portions 782 that are formed along a longitudinal direction of the aperture 78. On the other hand, in the attachment portion 601, restriction portions 602 that are to be inserted in the groove portions 782 are provided. When the restriction portions 602 of the attachment portion 601 are inserted in the groove portions 782, the movement of the aperture 78 in the optical axis direction D3 is restricted.

On the other hand, in the state where the aperture 78 is inserted in the attachment portion 601, a gap with a predetermined adjustment width w1 is formed in each of the left and right groove portions 782 of the aperture 78. With this configuration, in the attachment portion 601, the aperture 78 can move in the main scanning direction D1 in a predetermined range. Specifically, the aperture 78 can move in the main scanning direction D1 in the attachment portion 601 within a width range that is twice as large as the adjustment width w1. With this configuration, when the optical scanning device 6 is assembled, it is possible to adjust the incident position of the laser beam in the main scanning direction D1 on the polygon mirror 62 by adjusting the position of the aperture 78 in the main scanning direction D1. It is noted that the aperture 78 is an example of the second aperture, and the opening portion 781 is an example of the second opening portion.

The cylindrical lens 77 is an example of a converging lens that forms a linear image on the reflection surface (deflection surface) of the polygon mirror 62 by converging the laser beams in the sub scanning direction D2. Here, the laser beams are incident on the cylindrical lens 77 at positions that are different along the sub scanning direction D2 and incident on the polygon mirror 62 at different angles. With this configuration, the laser beams reflected on the polygon mirror 62 are guided to the outgoing mirrors 63-66 separately, and then guided to the photoconductor drums 101 of the image forming units 1-4.

Figure 6:
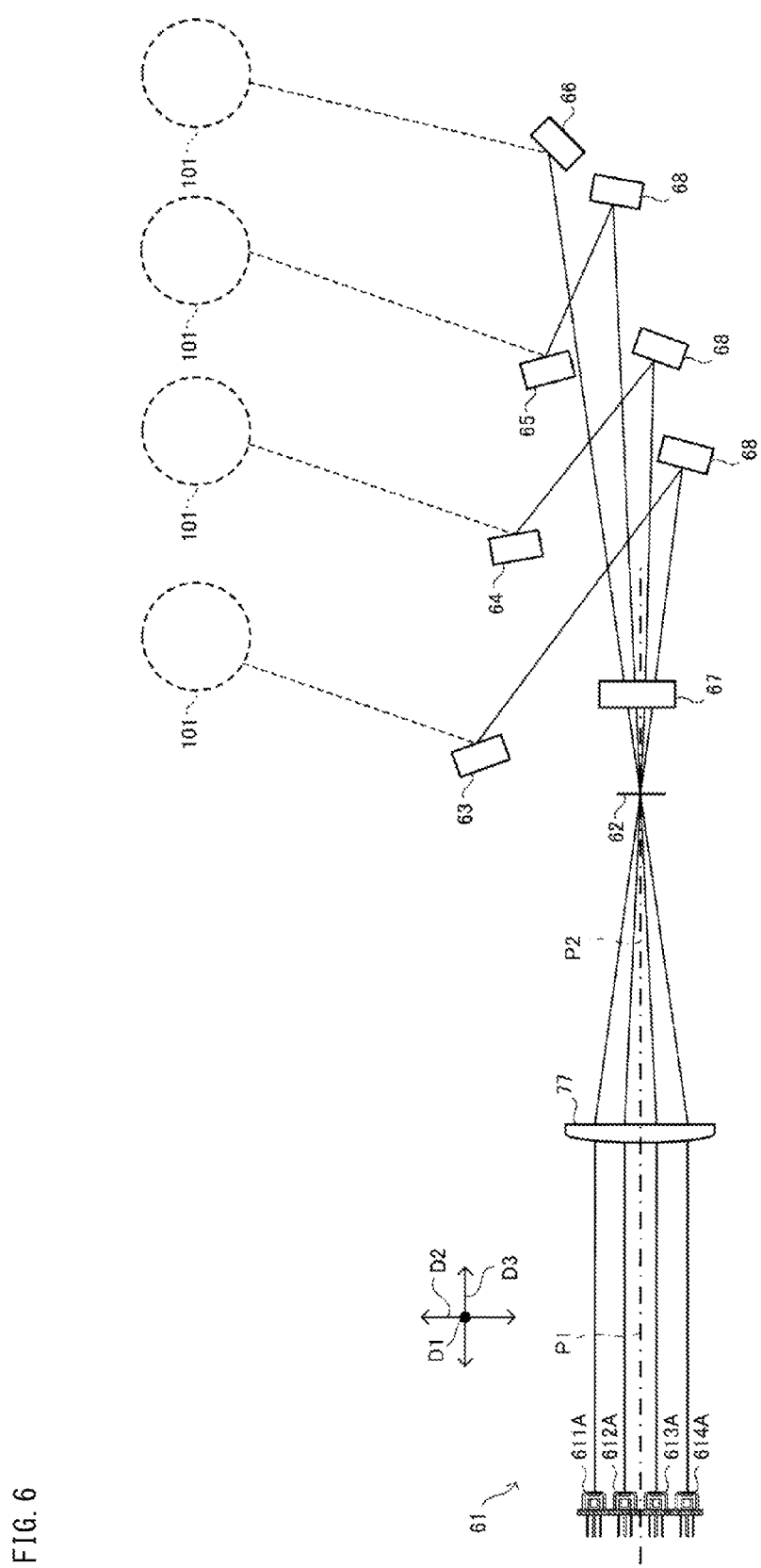
FIG. 6 is a schematic diagram showing beam paths of an optical scanning device according to a comparative example.

Meanwhile, as described above, the laser diodes 611A-614A are provided at different positions along the sub scanning direction D2. Here, in the optical scanning device 6, the plurality of laser diodes 611A-614A may be disposed toward opposite directions in the sub scanning direction D2 when viewed from the polygon mirror 62. Here, FIG. 6 is a schematic diagram showing the state where this configuration of the optical scanning device 6 is projected on a sub scanning plane that includes the sub scanning direction D2 and the optical axis direction D3 of the laser beams. As shown in FIG. 6, in this case, a center position P1 of the laser diodes 611A-614A in the sub scanning direction D2 and a center position P2 of the polygon mirror 62 are on a same straight line.

However, according to the configuration shown in FIG. 6, the arrangement of the LD boards 611-614, on which the laser diodes 611A-614A are installed, may inhibit the miniaturization of the optical scanning device 6 in size in the sub scanning direction D2. Specifically, in FIG. 6, the laser diodes 613A and 614A among the laser diodes 611A-614A are disposed below the center position P2 of the polygon mirror 62. As a result, the LD boards 613 and 614, on which the laser diodes 613A and 614A are installed, may inhibit the miniaturization of the optical scanning device 6 in size in the sub scanning direction D2.

On the other hand, the optical scanning device 6 is configured such that one polygon mirror 62 is used to scan the laser beams irradiated from the plurality of laser diodes 611A-614A, and this configuration is realized together with the miniaturization in size in the sub scanning direction D2. This is explained in the following. Here, FIG. 7 is a schematic diagram showing the state where this configuration of the optical scanning device 6 is projected on a sub scanning plane that includes the sub scanning direction D2 and the optical axis direction D3 of the laser beams.

Figure 7:
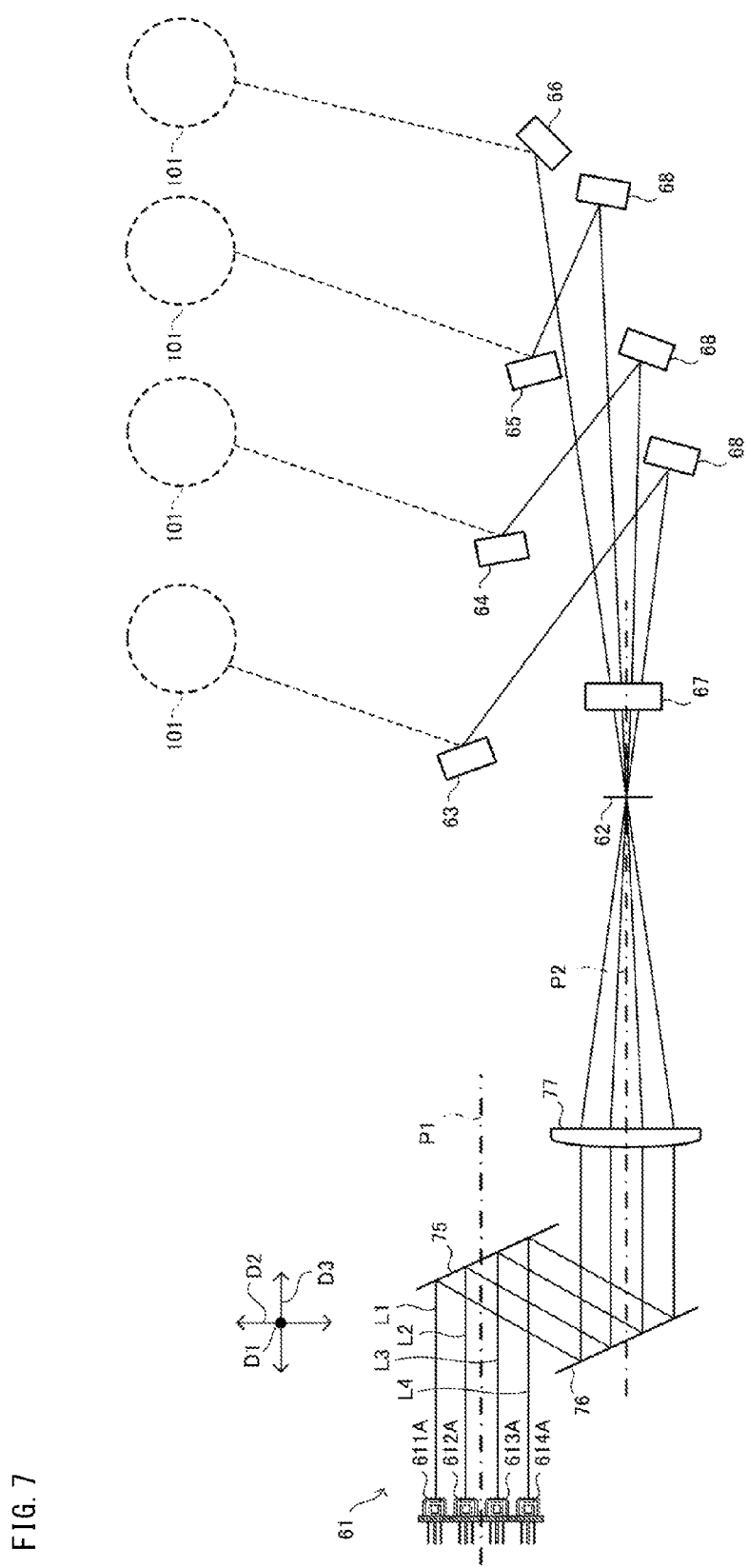
FIG. 7 is a schematic diagram showing beam paths of the optical scanning device according to the first embodiment of the present disclosure.

As shown in FIG. 7, in the light source unit 61, the first reflection mirror 75 and the second reflection mirror 76 are disposed in the state where they are inclined by a predetermined angle around the main scanning direction D1 as the rotation axis. That is, the first reflection mirror 75 and the second reflection mirror 76 are disposed in the state where they are inclined by a predetermined angle around the main scanning direction D1 as a rotation axis, and inclined around the sub scanning direction D2 as another rotation axis.

In particular, the first reflection mirror 75 and the second reflection mirror 76 reflect laser beams L1-L4 respectively irradiated from the laser diodes 611A-614A so as to travel parallel to the optical axis direction D3 of the laser beams L1-L4 toward positions that are different along the sub scanning direction D2. That is, the first reflection mirror 75 and the second reflection mirror 76 cause the laser beams L1-L4 to be moved in parallel along the sub scanning direction D2. Specifically, as shown in FIG. 7, the first reflection mirror 75 is inclined such that the laser beams L1-L4 are reflected downward in the sub scanning direction D2 and incident on the second reflection mirror 76. In addition, the second reflection mirror 76 is inclined such that the laser beams L1-L4 are reflected in a direction perpendicular to the sub scanning direction D2 and incident on the cylindrical lens 77.

In the optical scanning device 6 configured as described above, the arrangement positions of the laser diodes 611A-614A and the polygon mirror 62 in the sub scanning direction D2 can be arbitrarily shifted by changing the inclination angle of the first reflection mirror 75 and the second reflection mirror 76. That is, in the optical scanning device 6, it is possible to shift the center position P1 of the laser diodes 611A-614A and the center position P2 of the polygon mirror 62 in parallel along a direction. As a result, in the optical scanning device 6, it is possible to dispose the LD boards 611-614 with the laser diodes 611A-614A installed thereon by efficiently using the space in the sub scanning direction D2, thereby miniaturizing the optical scanning device 6 in size in the sub scanning direction D2.

Meanwhile, when the first reflection mirror 75 and the second reflection mirror 76 are only inclined around the sub scanning direction D2 as the rotation axis, the laser beams do not rotate around the optical axis direction D3 as the rotation axis before and after they are reflected by the first reflection mirror 75 and the second reflection mirror 76. However, with the configuration of the optical scanning device 6 where the first reflection mirror 75 and the second reflection mirror 76 are disposed in the state where they are inclined by a predetermined angle around the main scanning direction D1 as a rotation axis, and inclined around the sub scanning direction D2 as another rotation axis, the laser beams rotate around the optical axis direction D3 as a rotation axis before and after they are reflected by the first reflection mirror 75 and the second reflection mirror 76. As a result, laser beams that are incident on the first reflection mirror 75 and laser beams that are reflected by the second reflection mirror 76 and incident on the cylindrical lens 77 are different from each other in attitude in the direction of rotation around the optical axis direction D3 as a rotation axis.

Figure 8A:
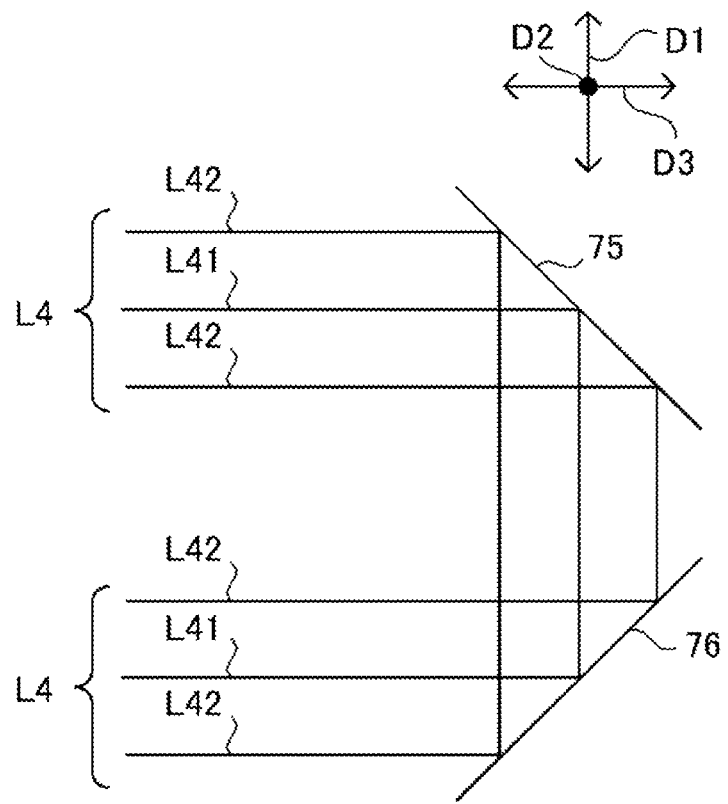
FIG. 8A and FIG. 8B are schematic diagrams showing beam paths of an optical scanning device according to a comparative example.
Figure 8B:
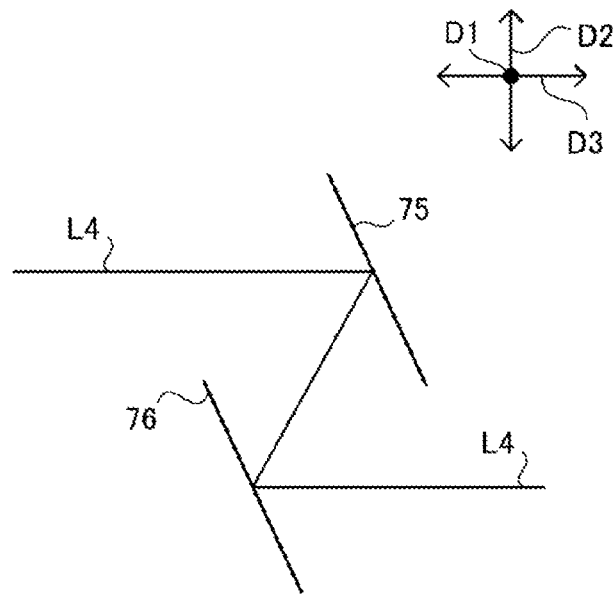

Here, FIG. 8A and FIG. 8B are diagrams showing reflection paths of the laser beams L4 when the first reflection mirror 75 and the second reflection mirror 76 are only inclined around the main scanning direction D1 as the rotation axis. In addition, FIG. 8A is a schematic diagram showing the state where the laser beams L4 reflected by the first reflection mirror 75 and the second reflection mirror 76 are projected on a main scanning plane that includes the main scanning direction D1 and the optical axis direction D3. On the other hand, FIG. 8B is a schematic diagram showing the state where the laser beams L4 reflected by the first reflection mirror 75 and the second reflection mirror 76 are projected on a sub scanning plane that includes the sub scanning direction D2 and the optical axis direction D3. It is noted that in FIG. 8A, the center beam of the laser beams L4 in the main scanning direction D1 is represented by L41, and end beams are represented by L42.

As shown in FIG. 8A, when the first reflection mirror 75 and the second reflection mirror 76 are only inclined around the main scanning direction D1 as the rotation axis, the center beam L41 and the end beams L42 are different from each other in the beam path length between the first reflection mirror 75 and the second reflection mirror 76, but have the same whole beam path length before and after the reflection by the first reflection mirror 75 and the second reflection mirror 76. In addition, as shown in FIG. 8B, the laser beams L4 in the sub scanning plane are represented by a straight line because the positions of the laser beams L4 that are reflected by the first reflection mirror 75 and incident on the second reflection mirror 76 are the same in the sub scanning direction D2.

Figure 9A:
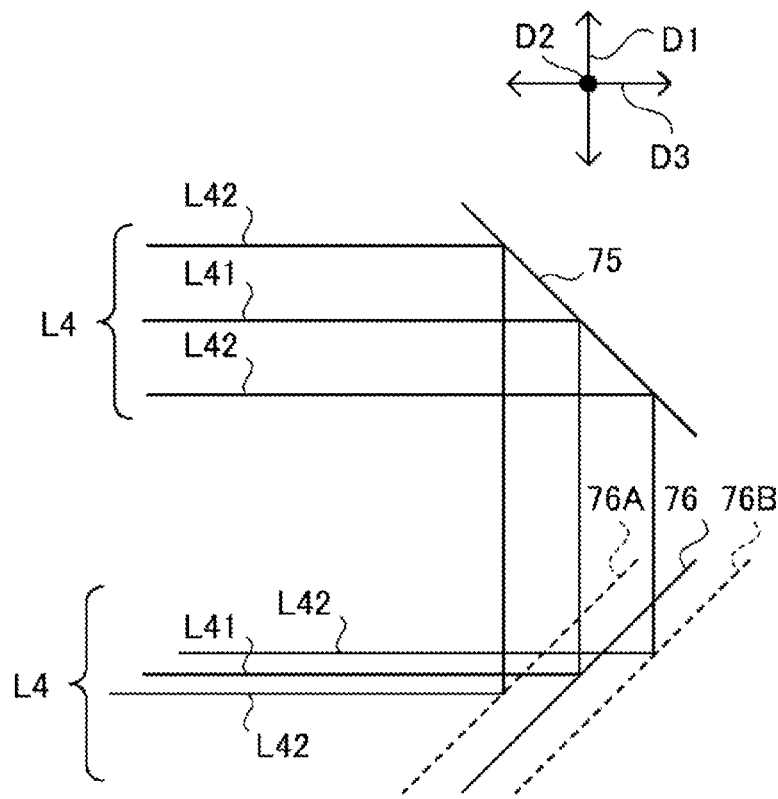
FIG. 9A and FIG. 9B are schematic diagrams showing beam paths of the optical scanning device according to the first embodiment of the present disclosure.
Figure 9B:
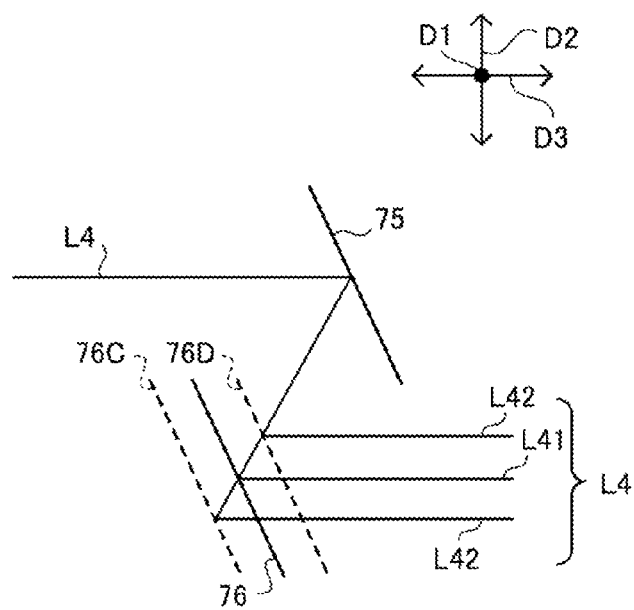

On the other hand, FIG. 9A and FIG. 9B are diagrams showing reflection paths of the laser beams L4 when the first reflection mirror 75 and the second reflection mirror 76 are inclined around the main scanning direction D1 as a rotation axis, and are inclined around the sub scanning direction D2 as another rotation axis. In addition, FIG. 9A is a schematic diagram showing the state where the laser beams L4 reflected by the first reflection mirror 75 and the second reflection mirror 76 are projected on the main scanning plane. On the other hand, FIG. 9B is a schematic diagram showing the state where the laser beams L4 reflected by the first reflection mirror 75 and the second reflection mirror 76 are projected on the sub scanning plane. It is noted that in FIG. 11A and FIG. 11B, too, the center beam of the laser beams L4 in the main scanning direction D1 is represented by L41, and end beams are represented by L42.

As shown in FIG. 9A, when the first reflection mirror 75 and the second reflection mirror 76 are inclined around the main scanning direction D1 as a rotation axis, and are inclined around the sub scanning direction D2 as another rotation axis, the center beam L41 and the end beams L42 are not only different from each other in the beam path length between the first reflection mirror 75 and the second reflection mirror 76, but also different from each other in the whole beam path length before and after the reflection by the first reflection mirror 75 and the second reflection mirror 76. In addition, as shown in FIG. 9B, since the positions of the laser beams L4 that are reflected by the first reflection mirror 75 and incident on the second reflection mirror 76 vary in the sub scanning direction D2 and the optical axis direction D3, the center beam L41 and the end beams L42 of the laser beams L4 in the sub scanning plane are represented as light beams that are separated from each other in the sub scanning direction D2. That is, the laser beams L4 that are incident on the cylindrical lens 77 are in the state of having rotated around the optical axis direction D3 as the rotation axis with respect to the laser beams L4 that are incident on the first reflection mirror 75.

Figure 10:
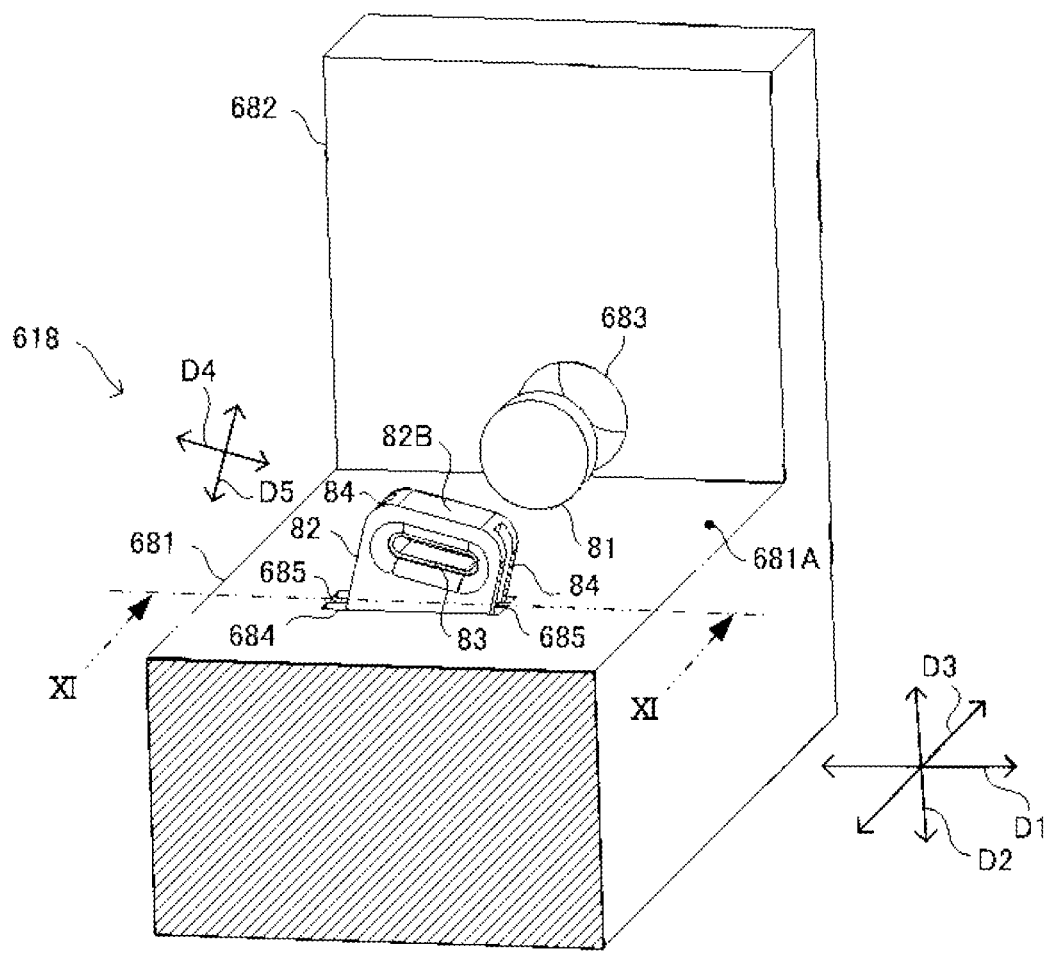
FIG. 10 is a diagram showing the configuration of an outgoing optical system of the optical scanning device according to the first embodiment of the present disclosure.
Figure 11:
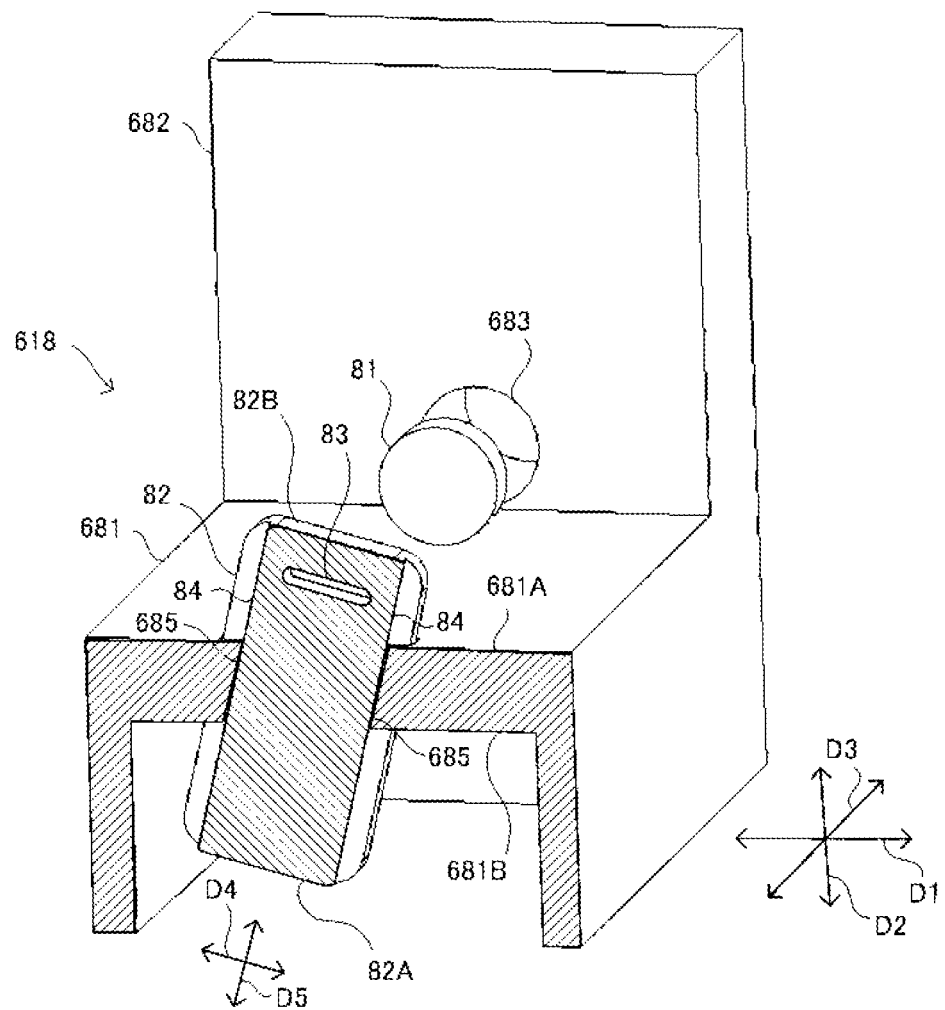
FIG. 11 is a diagram showing the configuration of the outgoing optical system of the optical scanning device according to the first embodiment of the present disclosure.

In view of the above, in the optical scanning device 6, in the outgoing optical systems 615-618, laser beams from the laser diodes 611A-614A are emitted toward the third reflection mirrors 71-74 in the state where the laser beams are inclined by a predetermined angle. Here, FIG. 10 and FIG. 11 are diagrams showing the configuration of the outgoing optical system 618. FIG. 10 is a cross section taken along a line X-X and viewed from the direction indicated by the arrows X of FIG. 3. FIG. 11 is a cross section taken along a line XI-XI and viewed from the direction indicated by the arrows XI of FIG. 10. It is noted that in the following description, the outgoing optical system 618 is taken as an example and the description of the outgoing optical systems 615-617 that have the same configuration as the outgoing optical system 618 is omitted.

As shown in FIG. 10 and FIG. 11, the outgoing optical system 618 includes a base portion 681, a wall portion 682, a collimator lens 81, and an aperture 82. The base portion 681 and the wall portion 682 constitute a part of the unit housing 60. The wall portion 682 has a pass-through portion 683 in which the laser diode 614A mounted on the LD board 614 can be inserted.

The collimator lens 81 is fixed to the base portion 681 by adhesion fixing using adhesive. The collimator lens 81 converts the laser beam emitted from the laser diode 614A of the LD board 614 to a parallel luminous flux and emits the parallel luminous flux. It is noted that as shown in FIG. 3, in the outgoing optical systems 616-618, the aperture 82 is disposed between the collimator lens 81 and the third reflection mirrors 72-74, and in the outgoing optical system 615, the third reflection mirror 71 is disposed between the collimator lens 81 and the aperture 82.

The base portion 681 includes a pass-through portion 684 that passes through between a front surface 681A and a rear surface 681B of the base portion 681, wherein the aperture 82 can be inserted in the pass-through portion 684. As shown in FIG. 11, the pass-through portion 684 is set in the state of being inclined by a predetermined angle around the optical axis direction D3 with respect to the main scanning direction D1. In addition, in the state where the aperture 82 is inserted in the pass-through portion 684, the aperture 82 is fixed to the base portion 681 by adhesion fixing using adhesive. It is noted that the base portion 681 is an example of the second base portion.

In addition, the pass-through portion 684 includes restriction portions 685 that are projections respectively projecting from the opposite ends in the longitudinal direction toward the inside of the opening, wherein the restriction portions 685 are to be inserted in groove portions 84 of the aperture 82, and the groove portions 84 are described below.

The aperture 82 includes an opening portion 83 and the groove portions 84. The opening portion 83 is used to restrict, to a width in a predetermined range, the beam path width of the laser beam which is traveling from the collimator lens 81 to the third reflection mirror 74. Here, the width of the opening portion 83 of the aperture 82 in a longitudinal direction D4 is larger than the width of the opening portion 781 of the aperture 78 in the main scanning direction D1, and the width of the opening portion 83 of the aperture 82 in the short-length direction is smaller than the width of the opening portion 781 of the aperture 78 in the sub scanning direction D2. It is noted that the aperture 82 is an example of the first aperture, and the opening portion 83 is an example of the first opening portion. The aperture 82 is disposed in the state where the longitudinal direction D4 of the opening portion 83 is inclined by a predetermined angle around the optical axis direction D3 with respect to the main scanning direction D1. Specifically, the aperture 82 is disposed in the state where the aperture 82 is inserted in the pass-through portion 684 of the base portion 681 such that the aperture 82 is inclined around the optical axis direction D3 as the rotation axis with respect to the main scanning direction D1.

Here, the inclination angle of the opening portion 83 has the same absolute value as the rotation angle of the laser beam around the optical axis direction D3 before and after the laser beam is incident on the first reflection mirror 75 and the second reflection mirror 76. On the other hand, the inclination direction D4 of the opening portion 83 is opposite to the rotation angle of the rotation of the laser beam around the optical axis direction D3 before and after the laser beam is incident on the first reflection mirror 75 and the second reflection mirror 76.

It is noted that inclination angles of the laser beam around the optical axis direction D3 before and after being incident on the first reflection mirror 75 and the second reflection mirror 76 can be calculated based on the inclination angles of the first reflection mirror 75 around the main scanning direction D1 and the sub scanning direction D2, and the inclination angles of the second reflection mirror 76 around the main scanning direction D1 and the sub scanning direction D2.

The groove portions 84 are formed along the longitudinal direction of the aperture 82, and the restriction portions 685 of the pass-through portion 684 are inserted in the groove portions 84. This restricts the aperture 82 from moving in the optical axis direction D3 and the longitudinal direction D4 of the opening portion 83. On the other hand, the aperture 82 is allowed to move in an insertion direction D5 that is perpendicular to the longitudinal direction D4 and the optical axis direction D3, by the groove portions 84 and the pass-through portion 684.

In the outgoing optical system 618, after the position of the aperture 82 in the insertion direction D5 in the pass-through portion 684 is adjusted, the aperture 82 is fixed to the base portion 681 by adhesion fixing using adhesive. At this time, for example, a photocurable resin that is cured by ultraviolet irradiation is used as the adhesive. In that case, it is necessary to irradiate ultraviolet light on the photocurable resin after the photocurable resin is applied to the aperture 82 and the pass-through portion 684. Here, if the aperture 82 could be held only by an upper end portion 82B of the aperture 82, the chuck portion of the robot arm or the hand of the worker that would be holding the aperture 82 would interrupt with the application of the photocurable resin and the irradiation of the ultraviolet light on the photocurable resin.

In the outgoing optical system 618, however, a lower end portion 82A of the aperture 82 projects from the rear surface 681B of the base portion 681 in the state where the aperture 82 is inserted in the pass-through portion 684 to such a position where the laser beam is incident on the opening portion 83. As a result, it is possible to apply the photocurable resin to the aperture 82 and the pass-through portion 684 and irradiate the ultraviolet light on the photocurable resin from above in the state where the chuck portion of the robot arm or the hand of the worker is holding the lower end portion 82A of the aperture 82 on the rear surface 681B side of the base portion 681. It is noted that the photocurable resin may be applied to the aperture 82 and the pass-through portion 684 from the rear surface 681B side of the base portion 681 and the ultraviolet light may be irradiated on the photocurable resin from the rear surface 681B side of the base portion 681 in the state where the upper end portion 82B of the aperture 82 is held.

In the optical scanning device 6 configured as described above, the beam path width of the laser beams that are emitted from the laser diodes 611A-614A and incident on the third reflection mirrors 71-74 is restricted by the opening portion 83 that is inclined around the optical axis direction D3 as the rotation axis with respect to the main scanning direction D1. Here, FIG. 12 is a schematic diagram viewing, in the optical axis direction D3, the laser beams L1-L4 that are emitted from the laser diodes 611A-614A and incident on the third reflection mirrors 71-74 and the cylindrical lens 77 in the optical scanning device 6.

Figure 12:
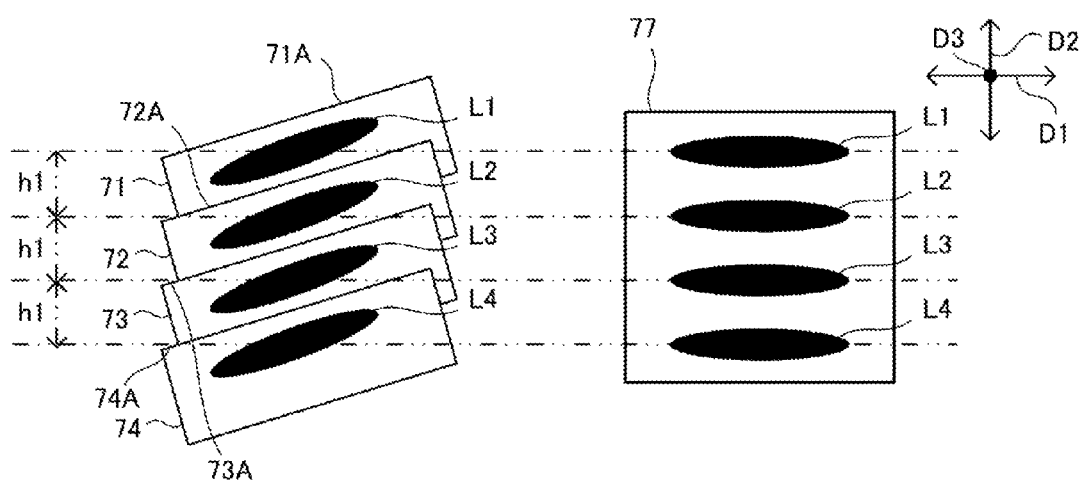
FIG. 12 is a diagram showing laser beams incident on third reflection mirrors and cylindrical lens in the optical scanning device according to the first embodiment of the present disclosure.

As shown in FIG. 12, the laser beams L1-L4 that are incident on the third reflection mirrors 71-74 enter the state where they are inclined around the optical axis direction D3 as the rotation axis with respect to the main scanning direction D1 since the beam path width of the laser beams L1-L4 is restricted by the opening portion 83 of the aperture 82. In the optical scanning device 6, the laser beams L1-L4 that have been reflected by the third reflection mirrors 71-74 are reflected by the first reflection mirror 75 and the second reflection mirror 76, and then incident on the cylindrical lens 77. Here, the laser beams L1-L4 that are incident on the first reflection mirror 75 are rotated in a direction opposite to the inclination direction of the laser beams L1-L4 in the third reflection mirrors 71-74 around the optical axis direction D3 as the rotation axis before and after the reflection by the first reflection mirror 75 and the second reflection mirror 76. As a result, in the optical scanning device 6, as shown in FIG. 12, it is possible to make the longitudinal direction of the laser beams L1-L4 that are incident on the cylindrical lens 77, to be parallel to the main scanning direction D1 with use of the first reflection mirror 75 and the second reflection mirror 76.

As a result, in the optical scanning device 6, in the configuration where the laser beams L1-L4 can be moved in parallel along the sub scanning direction D2 by using the first reflection mirror 75 and the second reflection mirror 76, it is possible to restrict the inclination of the laser beams L1-L4 that are incident on the cylindrical lens 77. It is noted that when the laser beams L1-L4 that are incident on the cylindrical lens 77 are not inclined due to the inclination angle of the first reflection mirror 75 and the second reflection mirror 76, a configuration where the opening portion 83 of the aperture 82 is not inclined may be considered as another embodiment.

Furthermore, in the light source unit 61 of the optical scanning device 6, as shown in FIG. 4, the third reflection mirrors 71-74 are disposed in the state where upper end surfaces 71A-74A thereof are inclined with respect to the main scanning direction Dl. Specifically, as shown in FIG. 12, the third reflection mirrors 71-74 are rectangular and fixed in the attitude where the upper end surfaces 71A-74A of the third reflection mirrors 71-74 are inclined with respect to the main scanning direction D1 by the same angle as the inclination angle of the longitudinal direction of the laser beams L1-L4. This makes it possible to shorten the arrangement interval of the laser diodes 611A-614A in the sub scanning direction D2, thereby reducing the size of the optical scanning device 6 in the sub scanning direction D2. It is noted that the third reflection mirrors 71-74 may be formed in a shape that enables them to be inclined around the optical axis direction D3 of the laser beam as the rotation axis, by the same angle as the longitudinal direction D4 of the opening portion 83.

Figure 13:
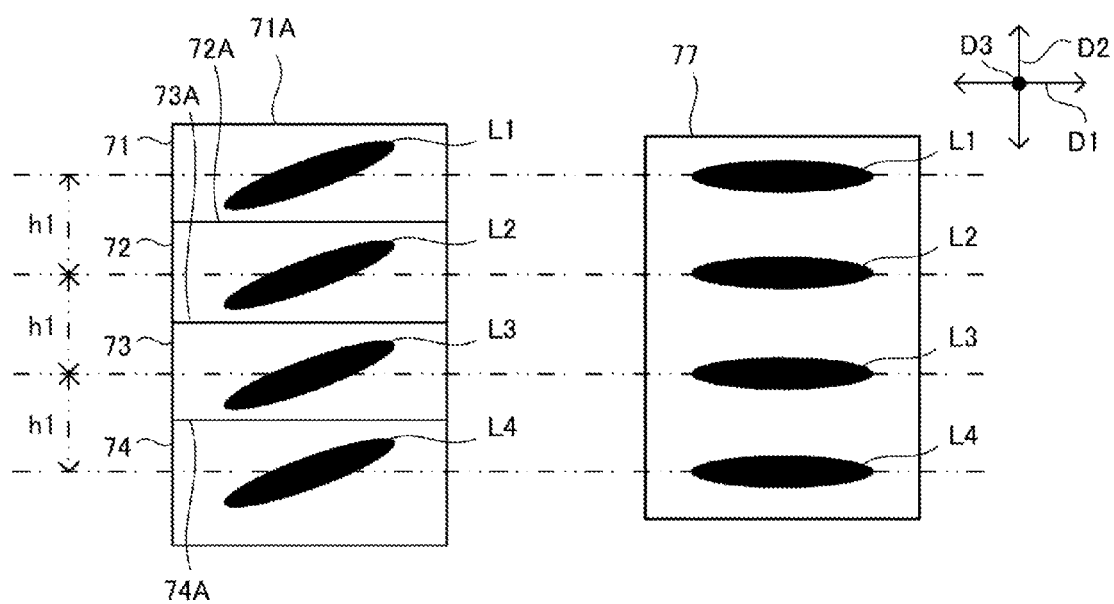
FIG. 13 is a diagram showing laser beams incident on third reflection mirrors and cylindrical lens in an optical scanning device according to a comparative example.

On the other hand, FIG. 13 shows a configuration example where the third reflection mirrors 71-74 are fixed in the attitude where the upper end surfaces 71A-74A are parallel to the main scanning direction D1. In the configuration shown in FIG. 13, as an interval h1 between each of the laser beams L1-L4 in the sub scanning direction D2, a relatively large width needs to be secured for the laser beams L1-L4 to be inclined. As a result, miniaturizing the optical scanning device 6 in size in the sub scanning direction D2 is inhibited.

Furthermore, in the optical scanning device 6, since the aperture 78 is disposed between the second reflection mirror 76 and the cylindrical lens 77 along the irradiation direction of the laser beams, it is possible to restrict the width of the laser beams in the main scanning direction D1 in the state where the longitudinal direction of the laser beams is parallel to the main scanning direction D1. As a result, it suffices that the attachment portion 601 has a shape that allows the aperture 78 to move only in the main scanning direction D1. Thus, in the light source unit 61, a configuration for restricting the width of the laser beams in the main scanning direction D1 is realized with a simpler structure than a case where the pass-through portion 684 is configured such that the aperture 82 can move in the longitudinal direction D4 of the opening portion 83.

It is noted that the aperture 78 is disposed on the downstream side of the second reflection mirror 76 and on the upstream side of the polygon mirror 62 in the laser beam irradiation direction. For example, the aperture 78 may be disposed between the cylindrical lens 77 and the polygon mirror 62. In addition, as another embodiment, the optical scanning device 6 may not include the aperture 78, and the pass-through portion 684 may allow the aperture 82 to move in a predetermined adjustment range in a direction parallel to the longitudinal direction D4 of the opening portion 83. It is noted that the pass-through portion 684 may have the same configuration as the attachment portion 601 and the aperture 78 so as to allow the aperture 82 to move in a direction parallel to the longitudinal direction D4 of the opening portion 83. In this case, too, it is possible to restrict, to a predetermined range, the width in the main scanning direction D1 of the laser beam that is incident on the cylindrical lens 77.

[Second Embodiment]

Meanwhile, the adjustment of the fixed state of the aperture 82 may be performed while photographing the laser beam by a camera including an imaging element such as a CCD. For example, during the adjustment work, the camera may be disposed between the cylindrical lens 77 and the polygon mirror 62, and after the adjustment work, the camera may be removed.

Figure 14A:
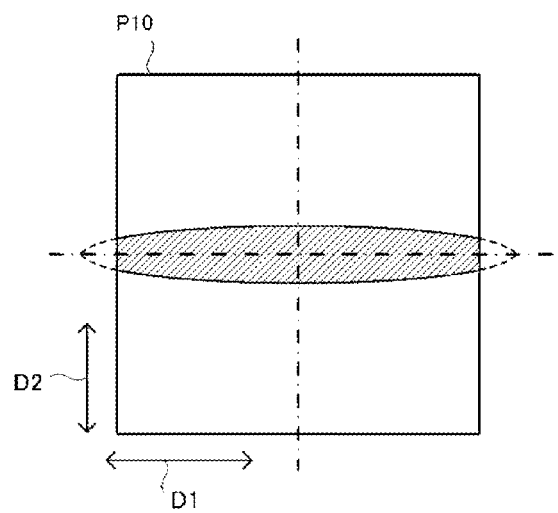
FIGS. 14A-14C are diagrams showing examples of photographed images taken by a camera used for an aperture fixing method in an optical scanning device according to a second embodiment of the present disclosure.
Figure 14B:
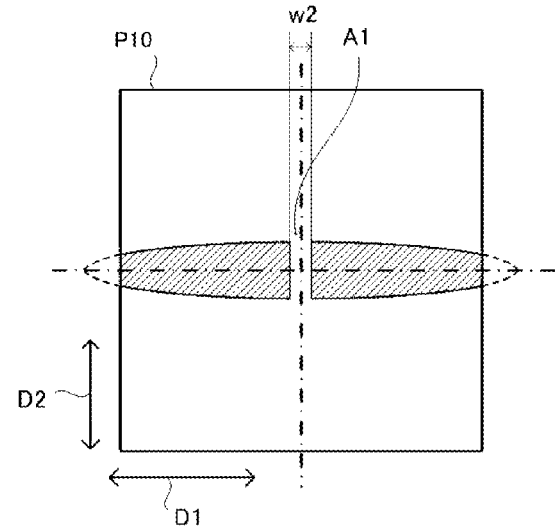
Figure 14C:
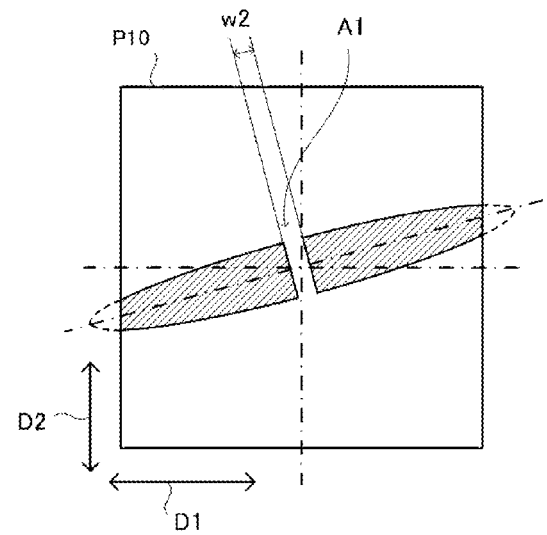

However, when, for example, the focal distance of a scanning lens such as an FO lens mounted in the optical scanning device 6 is long, the beam width in the main scanning direction D1 increases after the laser beam passes through the aperture 82. When the size of the camera is small relative to the beam width in the main scanning direction D1 of the laser beam, the end portions of the laser beam in the main scanning direction D1 may not be included in a photographed image P10 taken by the camera, as shown in FIG. 14A. It is noted that, as shown in FIGS. 14A-14C, the camera is disposed in the optical scanning device 6 such that the left-right direction of the photographed image P10 is parallel to the main scanning direction D1 and the up-down direction is parallel to the sub scanning direction D2. It is noted that, in FIGS. 14A-14C, the laser beam is represented by the hatched area.

Here, it may be considered to use a large-size camera to photograph the laser beam in its entirety in the main scanning direction D1. However, in that case, the setting position of the camera in the optical scanning device 6 is restricted when the fixed state of the aperture 82 is adjusted.

On the other hand, the image forming apparatus 10 according to the second embodiment described herewith provides a configuration where a small-size camera can be used when the fixed state of the aperture 82 is adjusted. It is noted that the components that are the same as those of the image forming apparatus 10 and the optical scanning device 6 described in the first embodiment are assigned the same reference signs, and description thereof is omitted.

Figure 15A:
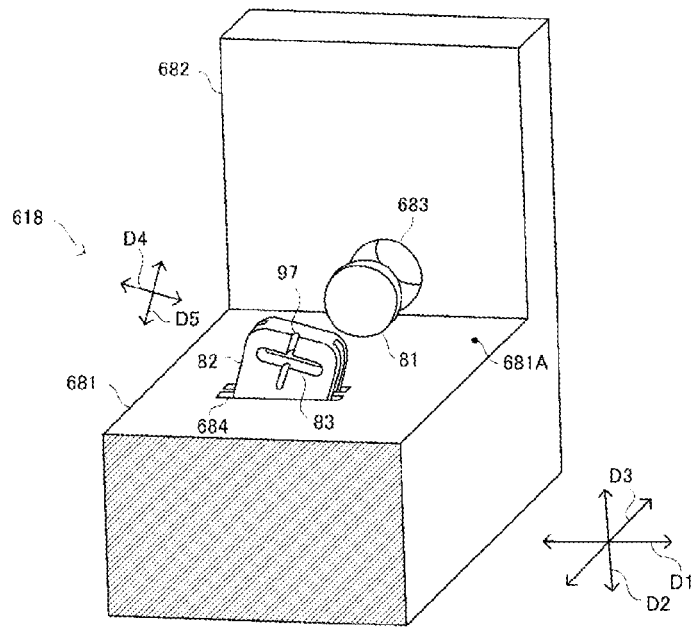
FIG. 15A and FIG. 15B are diagrams showing other examples of an outgoing optical system of the optical scanning device according to the second embodiment of the present disclosure.

Specifically, in the image forming apparatus 10 according to the second embodiment, as shown in FIG. 15A, the aperture 82 includes a cut portion 97 which is formed along the insertion direction D5 that is perpendicular to the longitudinal direction D4 of the opening portion 83, and in which a blocking member 98 that is described below can be inserted. Here, the cut portion 97 is an example of the first cut portion, and the blocking member 98 is an example of the first blocking member. The cut portion 97 is formed at a predetermined position such that the center thereof in the longitudinal direction D4 matches the center of the opening portion 83 in the longitudinal direction D4. The cut portion 97 is an indent portion formed on the surface (namely, the front surface) of the aperture 82 on the downstream side in the emission direction of the laser beam, and does not pass through the aperture 82 in a direction along the optical axis of the laser beam. As a result, the cut portion 97 does not affect the performance of the opening portion 83 of the aperture 82 in restricting the width of the laser beam.

Figure 15B:
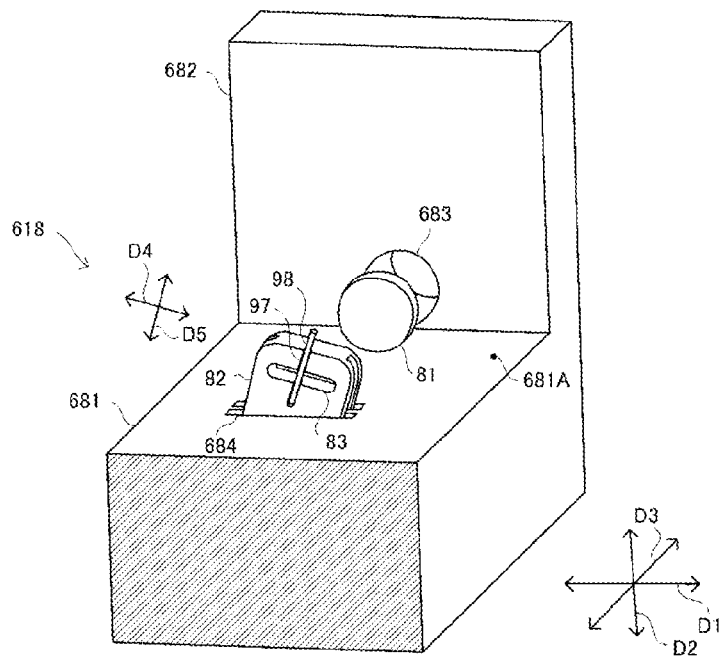

As shown in FIG. 15B, the blocking member 98 which is in the shape of a long cylinder and configured to block a part of the laser beam emitted from the laser diode 614A, can be attached to and detached from the cut portion 97. When a photograph is taken by the camera in the state where the blocking member 98 is attached to the cut portion 97, in the photographed image P10, a part of the laser beam emitted from the laser diode 614A is blocked by the blocking member 98, as shown in FIG. 14B. At this time, a blocked area Al that is formed in the laser beam by the blocking member 98 has a predetermined relationship with the opening portion 83 of the aperture 82. That is, the center of the opening portion 83 in the longitudinal direction D4 matches the center of the blocked area Al in the same direction. It is noted that a border line between the blocked area Al and the laser beam forms a line segment that is perpendicular to the longitudinal direction D4 of the opening portion 83.

With the above-described configuration, it is possible to identify the center position in the longitudinal direction D4 of the laser beam irradiated from the opening portion 83 of the aperture 82, by referring to the blocked area A1 in the photographed image P10. More specifically, the center position of the laser beam is the center of a width w2 that passes through the centers of the border lines of the blocked area A1 and the laser beam, and is perpendicular to the border lines. As a result, even when one or both ends of the laser beam are not included in the photographed image taken by the camera as shown in FIG. 14B, it is possible to identify the center position of the laser beam by referring to the blocked area A1. Thus, in the optical scanning device 6, it is possible to easily adjust the fixed state of the aperture 82 in the pass-through portion 684.

In addition, in the photographed image P10, the blocked area A1 generated by the blocking member 98 is inclined as shown in FIG. 14C when the laser beam irradiated from the aperture 82 enters the camera in an inclined state. This makes it possible to identify the inclinatin of the laser beam by referring to the blocked area A1 in the photographed image P10. More specifically, the inclination of the laser beam matches the inclination of a line segment that passes through the centers of the border lines of the blocked area A1 and the laser beam, and is perpendicular to the border lines. As a result, even when one or both ends of the laser beam are not included in the photographed image taken by the camera as shown in FIG. 14C, it is possible, by referring to the blocked area A1, to identify the inclination of the laser beam. As a result, in the optical scanning device 6, it is possible to easily adjust the fixed state of the aperture 82 in the pass-through portion 684.

More specifically, in the optical scanning device 6 of the second embodiment, the following work process is executed in the work process executed as the fixing method of the aperture 82. First, the blocking member 98 is inserted in the cut portion 97 of the aperture 82. Next, the laser beam that has passed through the opening portion 83 is photographed by the camera installed at a predetermined position (Step 1). Subsequently, the inclination and the center position in the longitudinal direction D4 of the laser beam that has passed through the opening portion 83 are identified based on the photographed image taken by the camera (Step 2). After this, the fixed state of the aperture 82 is adjusted based on the identified inclination and center position of the laser beam (Step 3).

As described above, according to the optical scanning device 6 of the second embodiment, it is possible to use a small-size camera when the fixed state of the aperture 82 is adjusted, resulting in relaxation of the restriction made to the setting position of the camera in the optical scanning device 6.

It is noted that the camera may be disposed between the reflection mirrors 71-74 and the reflection mirror 75. In that case, the laser beam photographed by the camera is inclined. However, by taking the inlination into account, it is possible to adjust the fixed state of the aperture 82 appropriately.

[Third Embodiment]

Next, a description is given of the image forming apparatus 10 according to the third embodiment. It is noted that the components that are the same as those of the second embodiment are assigned the same reference signs, and description thereof is omitted.

Figure 16A:
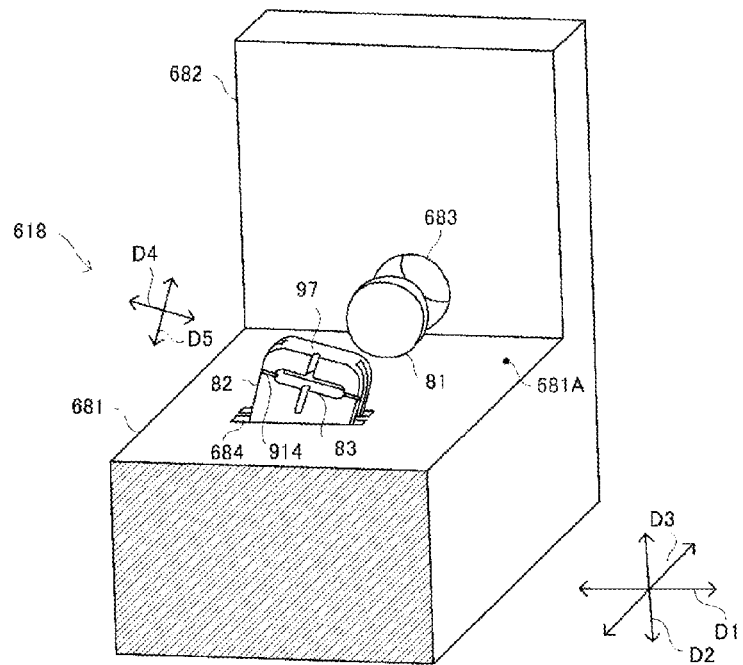
FIG. 16A and FIG. 16B are diagrams showing other examples of an outgoing optical system of the optical scanning device according to a third embodiment of the present disclosure.

As shown in FIG. 16A, the aperture 82 includes, in addition to the cut portion 97, a cut portion 914 which is formed in a direction parallel to the longitudinal direction D4 of the opening portion 83, and in which a blocking member 915 that is described below can be inserted. Here, the cut portion 914 is an example of the second cut portion, and the blocking member 915 is an example of the second blocking member The cut portion 914 is formed at a predetermined position such that the center thereof in the insertion direction D5 matches the center of the opening portion 83 in the insertion direction D5, wherein the insertion direction D5 is perpendicular to the longitudinal direction D4 of the opening portion 83. The cut portion 914 is an indent portion formed on the surface (namely, the front surface) of the aperture 82 on the downstream side in the emission direction of the laser beam, and does not pass through the aperture 82 in a direction along the optical axis of the laser beam. As a result, the cut portion 914 does not affect the performance of the opening portion 83 of the aperture 82 in restricting the width of the laser beam.

Figure 16B:
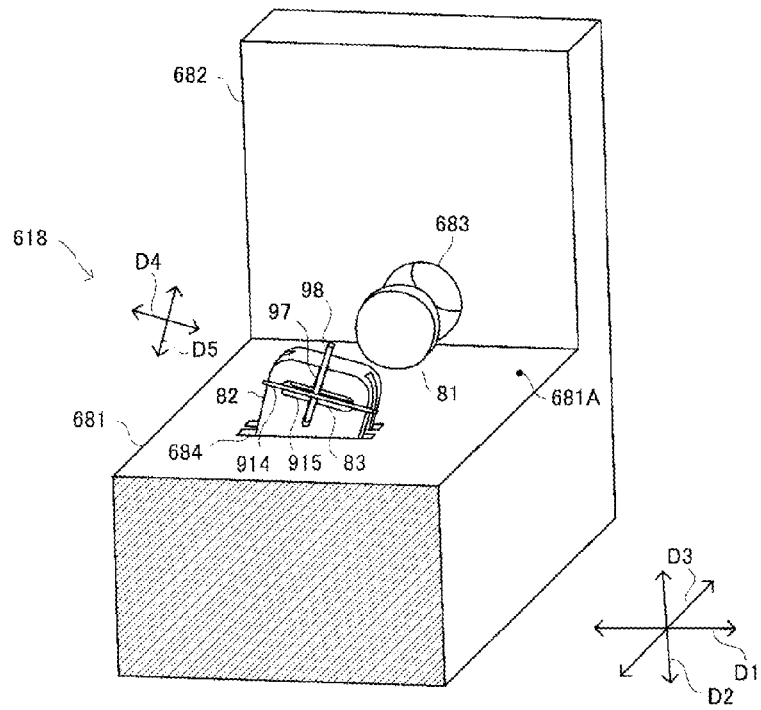
Figure 17A:
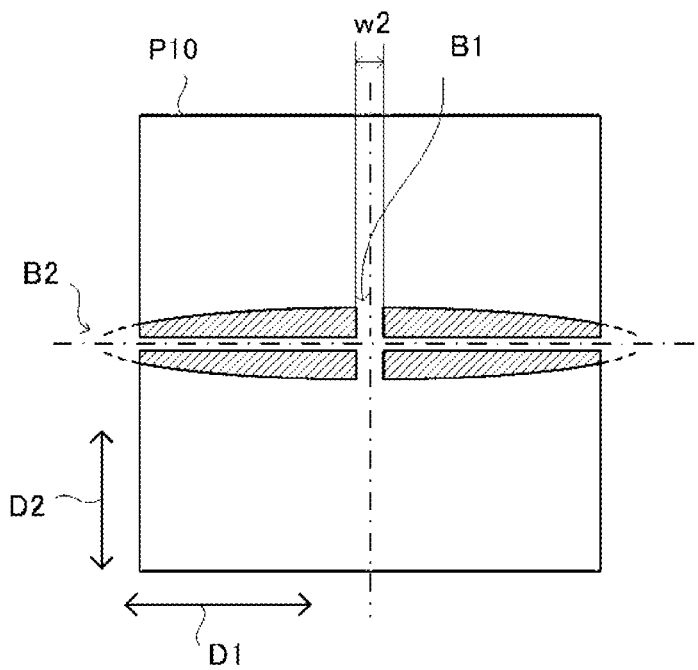
FIGS. 17A-17B are diagrams showing examples of photographed images taken by a camera used for an aperture fixing method in an optical scanning device according to a third embodiment of the present disclosure.

As shown in FIG. 16B, the blocking member 915 which is in the shape of a long cylinder and configured to block a part of the laser beam emitted from the laser diode 614A, can be attached to and detached from the cut portion 914. When a photograph is taken by the camera in the state where the blocking member 915 is attached to the cut portion 914, in the photographed image P10, a part of the laser beam is blocked by the blocking member 915, as shown in FIG. 17A. At this time, a blocked area B2 that is formed in the laser beam by the blocking member 915 has a predetermined relationship with the opening portion 83 of the aperture 82. Specifically, the longitudinal direction D4 of the opening portion 83 is parallel to the longitudinal direction of the blocked area B2, and a border line between the blocked area B2 and the laser beam forms a line segment that is parallel to the longitudinal direction D4 of the opening portion 83.

With the above-described configuration, it is possible to identify the inclination of the laser beam based on the photographed image P10. More specifically, even when one or both ends of the laser beam are not included in the photographed image taken by the camera as shown in FIG. 17A, it is possible to identify the inclination of the laser beam by referring to the blocked area B2. As a result, in the optical scanning device 6, it is possible to easily adjust the fixed state of the aperture 82 in the pass-through portion 684.

More specifically, in the optical scanning device 6 of the third embodiment, the following work process is executed in the work process executed as the fixing method of the aperture 82. First, the blocking member 98 is inserted in the cut portion 97 of the aperture 82, and the blocking member 915 is inserted in the cut portion 914 of the aperture 82. Next, the laser beam that has passed through the opening portion 83 is photographed by the camera installed at a predetermined position (Step 1). Subsequently, the inclination and the center position in the longitudinal direction D4 of the laser beam that has passed through the opening portion 83 are identified based on the photographed image taken by the camera (Step 2). After this, the fixed state of the aperture 82 is adjusted based on the identified inclination and center position of the laser beam (Step 3).

Figure 17B:
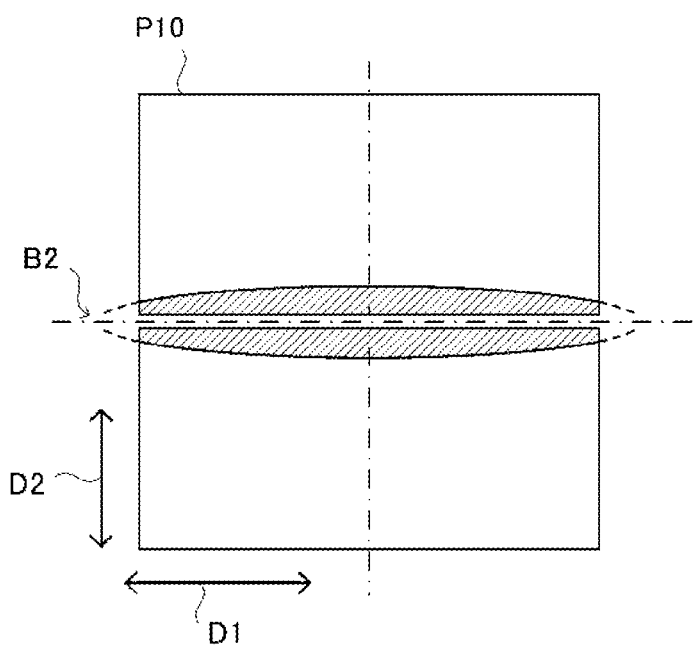

As described above, according to the image forming apparatus 10 of the third embodiment, it is possible to use a small-size camera when the fixed state of the aperture 82 is adjusted, resulting in relaxation of the restriction made to the setting position of the camera in the optical scanning device 6. It is noted that as another embodiment, the cut portion 97 may be omitted and only the cut portion 914 may be included. In that case, it is possible to identify the inclination of the laser beam by referring to the blocked area B2 in the photographed image P10 as shown in FIG. 17B.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An optical scanning device comprising:
a scanning member configured to scan incident laser beams in a predetermined main scanning direction;
a plurality of light sources configured to emit the laser beams respectively from positions that are different along a sub scanning direction that is perpendicular to an optical axis direction of the laser beams and the main scanning direction;
a first reflection mirror inclined around the main scanning direction as a rotation axis, inclined around the sub scanning direction as another rotation axis, and configured to reflect the laser beams emitted from the light sources;
a second reflection mirror inclined around the main scanning direction as a rotation axis, inclined around the sub scanning direction as another rotation axis, and configured to reflect the laser beams reflected by the first reflection mirror toward the scanning member; and
a third reflection mirror disposed in a state where at least an upper end surface thereof is inclined around the optical axis direction of the laser beams as a rotation axis, and configured to reflect the laser beams emitted from the light sources, toward the first reflection mirror.

2. The optical scanning device according to claim 1 further comprising:
an aperture having an opening portion and disposed in a state where a longitudinal direction of the opening portion is inclined by a predetermined angle around the optical axis direction of the laser beams as a rotation axis, the opening portion being configured to restrict a beam path width of the laser beams that are emitted from the light sources and incident on the first reflection mirror.

3. The optical scanning device according to claim 2 further comprising:
a base portion to which the aperture is fixed by adhesion fixing, the base portion including a pass-through portion configured to allow the aperture to move in a direction that is perpendicular to both the optical axis direction of the laser beams and the longitudinal direction of the opening portion.

4. The optical scanning device according to claim 3, wherein
the pass-through portion allows the aperture to move in a direction that is parallel to the longitudinal direction of the opening portion.

5. The optical scanning device according to claim 2, wherein
the aperture includes a first cut portion which is formed at a predetermined position of the opening portion to extend in a direction perpendicular to the longitudinal direction of the opening portion, and a first blocking member configured to block a part of the laser beams can be inserted in the first cut portion.

6. The optical scanning device according to claim 5, wherein
the first cut portion is an indent portion formed on a surface of the aperture on a downstream side in an emission direction of the laser beams.

7. The optical scanning device according to claim 2, wherein
the aperture includes a second cut portion which is formed at a predetermined position of the opening portion to extend in a direction parallel to the longitudinal direction of the opening portion, and a second blocking member configured to block a part of the laser beams can be inserted in the second cut portion.

8. The optical scanning device according to claim 7, wherein
the second cut portion is an indent portion formed on a surface of the aperture on a downstream side in an emission direction of the laser beams.

9. An image forming apparatus comprising:
the optical scanning device according to claim 1; and
an image forming unit configured to develop an electrostatic latent image and transfer an image developed from the electrostatic latent image to a sheet, the electrostatic latent image being formed on a photoconductor drum by the laser beams that are scanned by the optical scanning device.

10. An aperture fixing method implemented by the optical scanning device according to claim 5, the aperture fixing method comprising:
photographing, at a predetermined position, a laser beam that has passed through the opening portion in a state where the first blocking member is inserted in the first cut portion of the aperture;
identifying a center position in the longitudinal direction of the opening portion, of the laser beam that has passed through the opening portion, based on a photographed image of the laser beam; and
adjusting a fixed state of the aperture based on an identified center position of the laser beam in the longitudinal direction of the opening portion.

11. The optical scanning device according to claim 2, wherein an inclination angle of the third reflection mirror around the optical axis direction as the rotation axis and an inclination angle of the opening portion of the aperture around the optical axis direction as the rotation axis are the same.

12. The optical scanning device according to claim 3, wherein the pass-through portion is formed so as to be inclined around the optical axis direction of the laser beams.

* * * * *